(12) United States Patent
Deiterman

(10) Patent No.: US 6,982,509 B2
(45) Date of Patent: Jan. 3, 2006

(54) DRIP COVER FOR FLOOR POLISHING MACHINE

(75) Inventor: Lenard K. Deiterman, Springdale, AR (US)

(73) Assignee: Alto U.S. Inc., Springdale, AR (US)

( * ) Notice: Subject to any disclaimer, the term of this patent is extended or adjusted under 35 U.S.C. 154(b) by 0 days.

(21) Appl. No.: 10/709,579

(22) Filed: May 14, 2004

(65) Prior Publication Data

US 2004/0227419 A1  Nov. 18, 2004

Related U.S. Application Data

(60) Provisional application No. 60/320,201, filed on May 16, 2003.

(51) Int. Cl.
*H02K 5/10* (2006.01)
(52) U.S. Cl. .......................................... 310/89; 310/85
(58) Field of Classification Search .................. 310/85, 310/89, 71, 58, 60 R, 62, 63
See application file for complete search history.

(56) References Cited

U.S. PATENT DOCUMENTS

| | | | |
|---|---|---|---|
| 3,407,739 A | 10/1968 | Myers | |
| 3,761,748 A * | 9/1973 | Baumann et al. | 310/58 |
| 4,009,405 A | 2/1977 | Gleichman | |
| 4,086,507 A | 4/1978 | Roland et al. | |
| 4,513,214 A | 4/1985 | Dieringer | |
| 4,535,262 A | 8/1985 | Newberg | |
| 4,689,511 A | 8/1987 | Baker et al. | |
| 4,801,833 A | 1/1989 | Dye | |
| 4,845,396 A | 7/1989 | Huber | |
| 4,851,725 A | 7/1989 | Keck | |
| 4,885,440 A | 12/1989 | Kachuk | |
| 4,886,989 A | 12/1989 | Britt | |
| 4,904,166 A | 2/1990 | Wasemann | |
| 4,953,285 A | 9/1990 | Fisher | |
| 4,978,281 A | 12/1990 | Conger, IV | |
| 5,006,742 A | 4/1991 | Strobl et al. | |
| 5,076,762 A | 12/1991 | Lykes et al. | |
| 5,126,608 A | 6/1992 | Sogabe et al. | |
| 5,770,902 A | 6/1998 | Batten et al. | |
| 5,925,851 A | 7/1999 | Sugahara | |
| 6,091,171 A * | 7/2000 | Ohishi et al. | 310/68 B |
| 6,879,071 B2 * | 4/2005 | Kanazawa et al. | 310/71 |

* cited by examiner

*Primary Examiner*—Tran Nguyen

(57) ABSTRACT

Floor polishing machines include a motor housing, mounted vertically above the base of the machine that contains and protects the motor of the machine. A drip cover that may have a convex shape is mounted on the top of the motor housing and offset from the housing to provide a space between the housing and the cover through which air can flow to cool the motor during operation of the polishing machine. The drip cover has a cylindrical skirt that extends axially from the drip cover to surround the upper portion of the motor housing. Formed concentrically with the skirt, on the inner surface of the drip cover is a cup sized to accept, hold and protect the upper bearing of the motor. The drip cover further includes a downwardly facing electrical inlet or plug attached to the inner surface of the cover within the cylindrical skirt.

35 Claims, 2 Drawing Sheets

DRIP COVER FOR FLOOR POLISHING MACHINE

CROSS REFERENCE TO RELATED APPLICATIONS

This application claims the benefit of U.S. Provisional Application Ser. No. 60/320,201 filed May 16, 2003.

BACKGROUND OF INVENTION

The present invention relates to covers for the motors of floor polishing machines, and especially to drip covers that provide protection for the motor from liquids used during operation of the machines. More especially the present invention relates to integrated drip covers for floor polishing machines that provide protection for the motor against liquids, an electrical connection for the motor and a housing for the motor bearings.

Floor polishing machines are used to polish floors by the application of polish or wax and by buffing the floor to increase the luster. However, they may also be used with liquids, such as detergents and water, to clean the floors. A problem occurs when the machines are used with liquids. The housing of the motor is usually designed to direct air flow around and through the motor for cooling during operation and such a design often also allows any liquids being used to enter the housing. Liquid within the motor housing has a detrimental effect upon the life of both the motor and the bearings supporting the motor, shortening the operating life of the floor polishing machine. Another problem with prior art floor polishing machines has been the connection of the electrical power cord to the machine. An electrical power cord usually passes through the wall of the motor housing to be attached inside the motor. This design requires disassembly of the motor housing whenever damage to the cord or motor makes replacement necessary. It has also been common in the past for the bearings of the motor to be supported within a bearing cup that is supported by and part of the motor housing. This requires additional structure and additional weight for the motor housing, increasing the weight of the floor polishing machine and making it more unwieldy and less easily moved by the operator.

A splash proof cover for the end cap of a small permanent magnet direct current electric motor is described in U.S. Pat. No. 5,006,742. The cover has a molded plastic body that has a peripheral skirt that encircles the outer periphery of the motor end cap and an electrical socket housing that extends outwardly from the molded plastic body.

SUMMARY OF INVENTION

Floor polishing machines include a motor housing, mounted vertically above the base of the machine, that contains and protects the motor of the machine. The drip cover of this invention has a convex shape and is mounted on the top of the motor housing and offset from the housing to provide a space between the housing and the cover through which air can flow to cool the motor during operation of the polishing machine. The drip cover has a cylindrical skirt about its circumference that extends axially from the drip cover to surround the upper portion of the motor housing. Formed concentrically with the skirt, on the inner surface of the drip cover is a cup sized to accept, hold and protect the upper bearing of the motor. The drip cover further includes a downwardly facing electrical inlet or plug attached to the inner surface of the cover within the cylindrical skirt and outside the motor housing for connecting a power cord to supply electrical power to the motor of the floor polishing machine.

The present invention is further embodied in the shape of the drip cover. Typically a floor polishing machine has at least one motor starting capacitor attached to the outside surface of the motor housing. While the shape of the drip cover of the present invention is not critical, the preferred drip cover shapes will extend radially outwardly from the circumference of the motor housing to provide a cover for the capacitors attached to the outside wall of the motor housing. The shapes of the drip covers include, but are not limited to, covers that are round, covers that are generally round with lobes or expansion areas extending radially outwardly from the generally round shape of the cover, covers that are D-shaped or have similar non-symmetrical shapes and covers having other, similar shapes that will be apparent to those knowledgeable in the art after consideration of the disclosure herein.

The objects and advantages of the present invention will become more apparent by reference to the following detailed description when viewed in light of the accompanying drawings.

DETAILED DESCRIPTION

Figure 1:
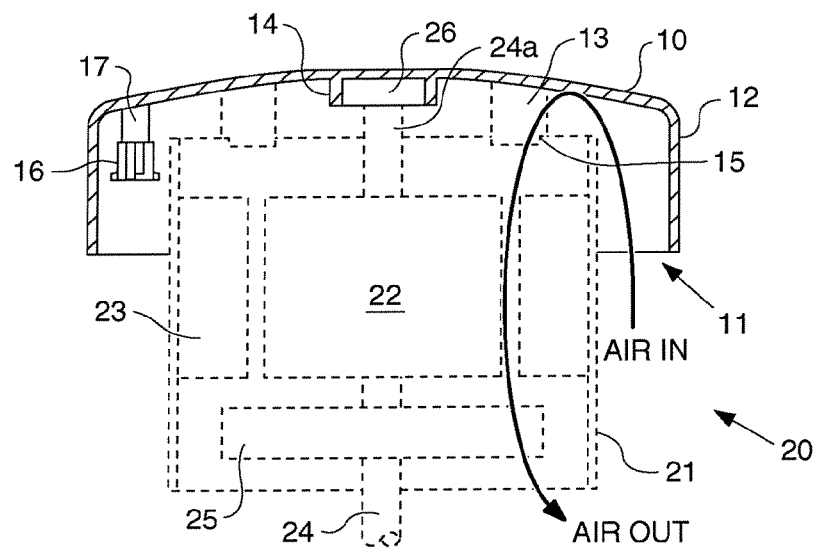
FIG. 1 is a section view, taken along section line A—A in FIGS. 2–4, of the drip cover of the present invention and a motor shown in phantom lines to illustrate the relationship between the drip cover and the motor to which the drip cover is attached.

A section view of the drip cover 10 of the present invention is shown in FIG. 1. The drip cover 10 is shown with a motor 20 in phantom lines to illustrate the relationship between the drip cover 10 and the motor 20 to which the drip cover is attached. Motor 20 is mounted vertically above the upper surface of the base of the floor polishing machine, not shown, by any conventional method. In addition to mounting the motor and motor housing on the base of the floor polishing machine, provision must be made for air flow to exit the motor housing after passing around and through the motor. Typically the motor and motor housing are mounted directly on the upper surface of the base of the floor polishing machine and held in that position by conventional fasteners. When mounted in this way, vents are commonly included in the walls of the motor housing for the passage of air from the housing. Alternatively, the motor and motor housing may be mounted to the upper surface of the base of the floor polishing machine using supports that create a space separating the motor and the motor housing from being directly mounted on the upper surface of the base of the polishing machine. When mounted in this way, the space between the base of the machine and the lower portion of the motor housing allows the flow of air from the motor housing.

Motor 20 includes a hollow cylindrical motor housing 21 with cylindrical rotor 22 positioned within a toroidally shaped field 23 that is mounted within motor housing 21. Rotor 22 is mounted on shaft 24 and fan 25 is also mounted on shaft 24 in a position separated from motor 22 and positioned below motor 22, between motor 22 and the upper surface of the base of the floor polishing machine, not shown. A bearing 26 is mounted on the upper end 24a of shaft 24. Bearing 26 allows rotation of shaft 24, rotor 22, fan 25 and the conventional polishing elements within the base of the floor polisher, not shown. The motor 20 also includes at least one starting capacitor, not shown, that is mounted externally and attached to the outer surface of motor housing 21.

Drip cover 10, shown in section in FIG. 1, covers the upper end of motor housing 21. The drip cover 10 may have a convex shape and is mounted on the top of the motor housing 21 and offset from the housing 21 to provide a space 11 between the housing 21 and the cover 10 through which air can flow to cool the motor 20 during operation of the polishing machine. The drip cover 10 may be made of any conventional material that can be formed into the desired shape by molding or other forming processes such as molded plastic, cast aluminum or cast iron. Plastic may be preferred because it is non-conductive, easily molded and lighter in weight than cast aluminum or iron, but any suitable material may be used. The diameter of the drip cover 10 is at least as large as the diameter of the motor housing 21. It is preferred that the diameter of the drip cover 10 be larger than the diameter of the motor housing, or that it have a shape other than round, so that the drip cover 10 will protect the motor housing 21 and the start capacitor, not shown, attached to the outer surface of the motor housing 21. The drip cover 10 has a cylindrical skirt 12 about its circumference that extends axially from the drip cover 10 to surround the upper portion of the motor housing 21. Formed concentrically with the skirt 12, on the inner surface of the drip cover 10 is a cup 14 sized to accept, hold and protect the upper bearing 26 of the motor 20. The drip cover 10 is offset from the top of motor housing 21 by a plurality of bosses 13 that are formed concentrically with and inside the skirt 12 on the inside surface of the drip cover 10. The bosses 13 are positioned in a circle having the same diameter as the motor housing 21 and the ends of the bosses 13 opposite the inside surface of the drip cover 10 are cut to form a rabbet surface 15 that cooperates with the upper edge of motor housing 21 to support the drip cover 10 offset from the end of the motor housing 21. A hole 18, shown in FIGS. 2–4, extends axially through the drip cover 10 and bosses 13 and a conventional bolt, screw or similar fastener having sufficient length to reach from the drip cover 10 to the base of the floor polishing machine is used to removably attach the drip cover 10, the motor 20 and the motor housing 21 to the upper surface of the base of the floor polishing machine. The drip cover 10 further includes a downwardly facing electrical connector 16 attached by boss 17 to the inner surface of the drip cover 10 within the cylindrical skirt 12 and outside the motor housing 21 for connecting a power cord to supply electrical power to the motor 20 of the floor polishing machine. The electrical inlet or plug 16 is attached to boss 17 by conventional screws or similar fasteners. The electrical inlet or plug 16 is a universal IEC 320 connector, a connector that meets the specifications established by the International Electrotechnical Commission for interchangeable electrical connectors that allow a motor to accept different electrical voltages and currents. The power cord is removably attached to the electrical inlet or plug 16 to provide electrical power to the motor 20 for operation of the floor polishing machine. If the power cord is damaged during operation of the floor polishing machine, the power cord can be replaced without disassembly of any part of the motor. The power cord is disconnected from electrical inlet or plug 16 and a new power cord is then connected to electrical inlet or plug 16 to complete replacement of the power cord. The electrical wiring between electrical inlet or plug 16 and motor 20 may have any conventional configuration and is omitted for clarity of the drawings.

The drip cover 10 has a convex shape and a cylindrical skirt 12 about its circumference that extends axially from the drip cover 10 to surround the upper portion of the motor housing 21 to prevent liquid from entering the motor housing 21. Tests for electrical equipment operated in the presence of liquids require that the liquid be sprayed on the equipment in a prescribed pattern. The liquid, water in this instance, is sprayed against the equipment in a pattern that begins with horizontal liquid flow, moves to have the liquid flowing vertically downward and then returns to flow against the equipment in the horizontal plane. The axially extending skirt 12 prevents liquid, even liquid flowing in a horizontal direction against the surface of the motor housing 21, from entering the motor housing 21.

The orientation of the electrical inlet or plug 16 also helps prevent the entry of liquids into the motor housing 21. The electrical inlet or plug 16 faces downward. Thus, the power cable will hang downwardly from the inlet or plug 16 when the cable is attached. Any liquid splashing on the cable will flow toward the low spot on the cable and drip to the floor rather than flow upwardly toward the inlet or plug 16 where it could enter the motor housing 21.

During operation of the floor polisher, the motor 20 creates heat and the fan 25 moves air around and through the motor 20 for cooling. Air enters through the space 11 and flows along the inner surface of drip cover 10 into motor housing 21. Fan 25 moves the air around and through the motor 20 and forces the air to exit the motor housing 21. If the motor housing 21 is directly attached to the upper surface of the base of the floor polishing machine as described above, exit vents are required in the lower portion of the motor housing 21. A centrifugal fan forces the air radially to exit the motor housing 21 through the vents. If the motor housing 21 is mounted such that it is spaced from the upper surface of the base of the floor polishing machine as described above, an axial fan forces the air to exit the motor housing 21 by flowing through the space between the lower edge of the motor housing 21 and the upper surface of the base of the floor polisher.

Figure 3:
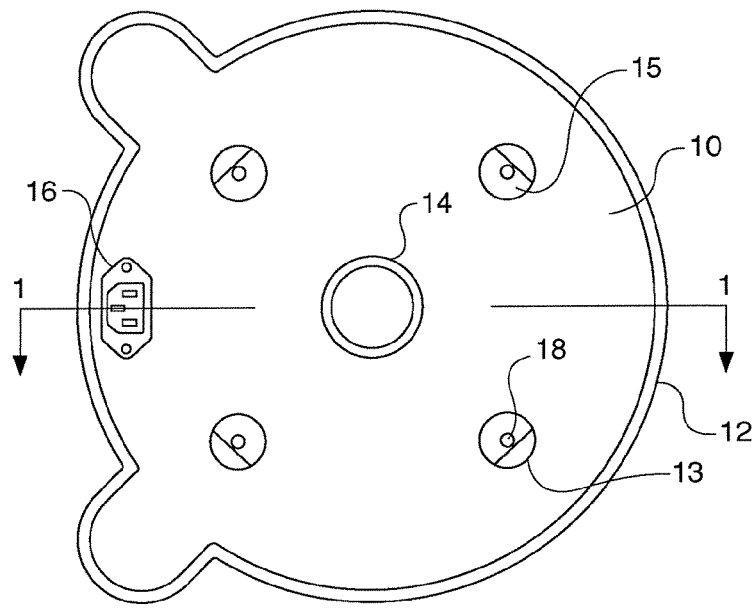
FIG. 3 is a bottom view of a second embodiment of the drip cover of the present invention illustrating a cover having a round shape with extending lobes.
Figure 2:
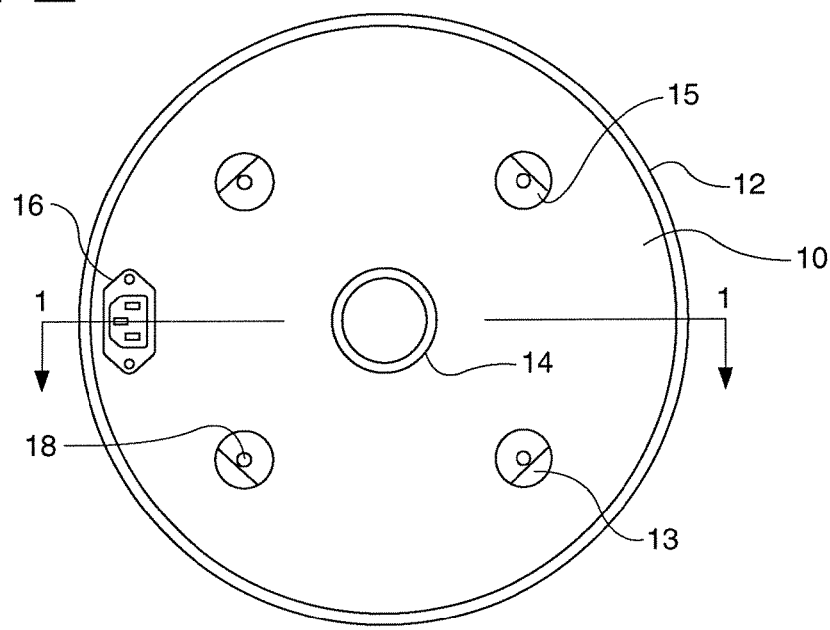
FIG. 2 is a bottom view of one embodiment of the drip cover of the present invention illustrating a cover having a round shape.
Figure 4:
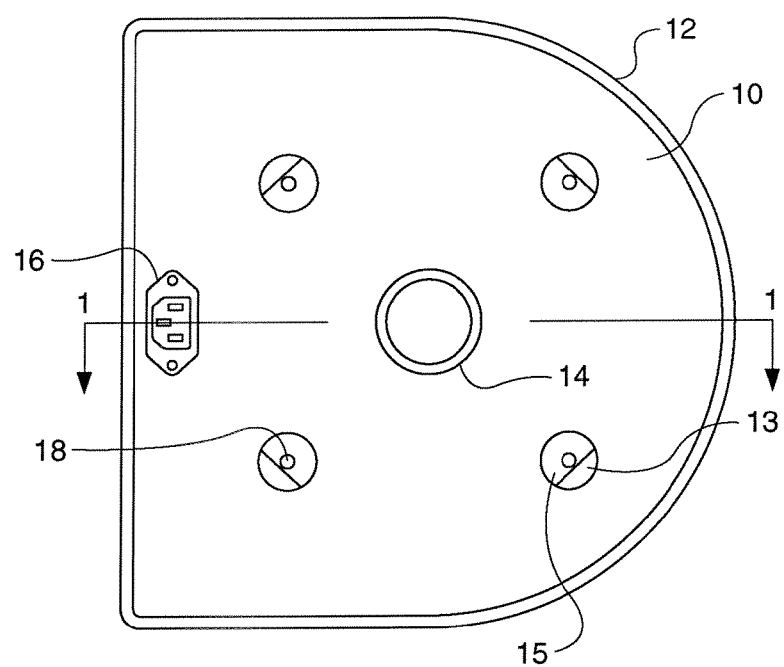
FIG. 4 is a bottom view of a third embodiment of the drip cover of the present invention illustrating a cover having a D-shape.

Turning now to FIGS. 2–4, a bottom view of three embodiments of the drip cover 10 of this invention are shown. In each of FIGS. 2–4, the section line A—A indicates the section shown in FIG. 1 and where identical numbers are used in the different figures they indicate the identical item.

In FIG. 2 a drip cover 10 having a round shape and a circular, cylindrical skirt 12 is shown. In FIG. 2, four bosses 13 form the plurality of bosses 13 cited above. Each boss 13 is cut to form a rabbet surface 15 that cooperates with the upper edge of motor housing 21 to support the drip cover 10 offset from the end of the motor housing 21. A hole 18 extends axially through the drip cover 10 and bosses 13 and a conventional bolt, screw or similar fastener having sufficient length to reach from the drip cover 10 to the base of the floor polishing machine is used to removably attach the drip cover 10, the motor 20 and the motor housing 21 to the upper surface of the base of the floor polishing machine. Formed concentrically with the skirt 12, on the inner surface of the drip cover 10 is cup 14 sized to accept, hold and protect the upper bearing 26 of the rotor 22. The drip cover 10 further includes a downwardly facing electrical connector 16 attached by boss 17 to the inner surface of the drip cover 10 within the cylindrical skirt 12 and outside the motor housing 21 for connecting a power cord to supply electrical power to the motor 20. The electrical connector 16 is attached to boss 17 by conventional screws or similar fasteners.

In FIG. 3 a drip cover 10 having a generally round shape with lobes or expansion areas extending radially outwardly from the generally round shape of the cover 10 and a cylindrical skirt 12 is shown. The lobes or expansion areas extend over the top of the starting capacitor, or capacitors, attached to the outer surface of the motor housing 21 to prevent liquid from splashing on the top of the capacitor. In FIG. 3, four bosses 13 form the plurality of bosses 13 cited above. Each boss 13 is cut to form a rabbet surface 15 that cooperates with the upper edge of motor housing 21 to support the drip cover 10 offset from the end of the motor housing 21. A hole 18 extends axially through the drip cover 10 and bosses 13 and a conventional bolt, screw or similar fastener having sufficient length to reach from the drip cover 10 to the base of the floor polishing machine is used to removably attach the drip cover 10, the rotor 22 and the motor housing 21 to the upper surface of the base of the floor polishing machine. Formed concentrically with the skirt 12, on the inner surface of the drip cover 10 is cup 14 sized to accept, hold and protect the upper bearing 26 of the rotor 22. The drip cover 10 further includes a downwardly facing electrical inlet or plug 16 attached by boss 17 to the inner surface of the drip cover 10 within the cylindrical skirt 12 and outside the motor housing 21 for connecting a power cord to supply electrical power to the motor 20. The electrical inlet or plug 16 is attached to boss 17 by conventional screws or similar fasteners.

In FIG. 4 a drip cover 10 having a D-shape and a cylindrical skirt 12 is shown. The pointed areas of the D-shape provide the same function as the lobes shown in FIG. 3. They extend over the top of the starting capacitor, or capacitors, attached to the outer surface of motor housing 21 to prevent liquid from splashing on the top of the capacitor. In FIG. 4, four bosses 13 form the plurality of bosses 13 cited above. Each boss 13 is cut to form a rabbet surface 15 that cooperates with the upper edge of motor housing 21 to support the drip cover 10 offset from the end of the motor housing 21. A hole 18 extends axially through the drip cover 10 and bosses 13 and a conventional bolt, screw or similar fastener having sufficient length to reach from the drip cover 10 to the base of the floor polishing machine is used to removably attach the drip cover 10, the motor 22 and the motor housing 21 to the upper surface of the base of the floor polishing machine. Formed concentrically with the skirt 12, on the inner surface of the drip cover 10 is cup 14 sized to accept, hold and protect the upper bearing 26 of the rotor 22. The drip cover 10 further includes a downwardly facing electrical connector 16 attached by boss 17 to the inner surface of the drip cover 10 within the cylindrical skirt 12 and outside the motor housing 21 for connecting a power cord to supply electrical power to the motor 20. The electrical inlet plug 16 is attached to boss 17 by conventional screws or similar fasteners.

Although the present invention has hereinabove been described with respect to the illustrated embodiments, it will be understood that the invention is capable of modification and variation without departing from the scope of the invention and the invention is limited only by the following claims.

What is claimed is:

1. A drip cover for a vertically mounted motor having an upper portion, an upper bearing and a base comprising:
    a cover having an inner surface and a circumference;
    a cylindrical skirt extending axially from the circumference of the cover to surround the upper portion of the motor;
    a cup formed on the inner surface of the cover concentrically with the skirt and sized to hold and protect the upper bearing of the motor; and
    a downwardly facing electrical connector attached to the inner surface of the cover within the cylindrical skirt and outside the motor, the cover being mounted on and spaced from the upper portion of the motor by a plurality of bosses mounted on the inner surface of the cover and formed concentrically within the skirt on a circle having the same diameter as the motor.

2. The drip cover of claim 1 wherein the cover has a convex shape.

3. The drip cover of claim 1 wherein the cover has a diameter greater than the diameter of the motor.

4. The drip cover of claim 3 wherein the plurality of bosses have ends opposite the inside surface of the cover, the ends being cut to form a rabbet surface that cooperates with the upper portion of the motor to support the cover spaced from the upper portion of the motor.

5. The drip cover of claim 4 wherein the cover is mounted on and spaced from the upper portion of the motor by a plurality of bosses and fasteners having sufficient length to attach the cover and motor to the base.

6. The drip cover of claim 5 wherein the fasteners are selected from the group consisting of bolts and screws.

7. The drip cover of claim 1 wherein the cover is removably mounted on and spaced from the upper portion of the motor.

8. A drip cover for a vertically mounted motor having an upper portion, an upper bearing and a base comprising:
    a cover having an inner surface and a circumference;
    a cylindrical skirt extending axially from the circumference of the cover to surround the upper portion of the motor;
    a cup formed on the inner surface of the cover concentrically with the skirt and sized to hold and protect the upper bearing of the motor; and
    a downwardly facing electrical connector attached to the inner surface of the cover within the cylindrical skirt and outside the motor, the cover being mounted on and spaced from the upper portion of the motor by a plurality of bosses mounted on the inner surface of the cover and formed concentrically within the skirt on a circle having the same diameter as the motor and fasteners having sufficient length to attach the cover and motor to the base.

9. The drip cover of claim 8 wherein the plurality of bosses have ends opposite the inside surface of the cover, the ends being cut to form a rabbet surface that cooperates with the upper portion of the motor to support the cover spaced from the upper portion of the motor.

10. The drip cover of claim 1 wherein the cover is formed from a material selected from the group consisting of plastic, aluminum and iron.

11. The drip cover of claim 10 wherein the cover is formed from plastic.

12. The drip cover of claim 1 wherein the circumference of the cover has a shape selected from the group consisting of shapes that are generally round, shapes that are generally round with lobes or expansion areas extending radially outwardly from the generally round portion of the shape and shapes that are non-symmetrical in the shape of the letter D and similar letters.

13. A drip cover for a vertically mounted motor having an upper portion and an upper bearing mounted on a base, the drip cover comprising a cover having a convex shape having an inner surface, a circumference and a diameter greater than the diameter of the motor, a cylindrical skirt extending axially from the circumference of the cover to surround the upper portion of the motor, a cup formed on the inner surface of the cover concentrically with the skirt and sized to hold and protect the upper bearing of the motor, and a downwardly facing electrical connector attached to the inner surface of the cover within the cylindrical skirt and outside the motor, the cover being mounted on and spaced from the upper portion of the motor by a plurality of bosses mounted on the inner surface of the cover and formed concentrically within the skirt on a circle having the same diameter as the motor.

14. The drip cover of claim 13 wherein the plurality of bosses have ends opposite the inside surface of the cover, the ends being cut to form a rabbet surface that cooperates with the upper portion of the motor to support the cover spaced from the upper portion of the motor.

15. The drip cover of claim 13 wherein the cover is formed from a material selected from the group consisting of plastic, aluminum and iron.

16. The drip cover of claim 15 wherein the cover is formed from plastic.

17. The drip cover of claim 13 wherein the circumference of the cover has a shape selected from the group consisting of shapes that are generally round, shapes that are generally round with lobes or expansion areas extending radially outwardly from the generally round portion of the shape and shapes that are non-symmetrical in the shape of the letter D and similar letters.

18. The drip cover of claim 13 wherein the cover is mounted on and spaced from the upper portion of the motor by a plurality of bosses and fasteners having sufficient length to attach the cover and motor to the base.

19. The drip cover of claim 18 wherein the fasteners are selected from the group consisting of bolts and screws.

20. The drip cover of claim 13 wherein the cover is removably mounted on and spaced from the upper portion of the motor.

21. A drip cover for a floor polisher having an vertically mounted upper portion, an upper bearing and a base comprising:
 a cover having an inner surface and a circumference;
 a cylindrical skirt extending axially from the circumference of the cover to surround the upper portion of the motor;
 a cup formed on the inner surface of the cover concentrically with skirt and sized to hold and protect the upper bearing of the motor; and
 a downwardly facing electrical connector attached to the inner surface of the cover within the cylindrical skirt and outside the motor, the cover being mounted on and spaced from the upper portion of the motor by a plurality of bosses mounted on the inner surface of the cover and formed concentrically within the skirt on a circle having the same diameter as the motor, the plurality of bosses having ends opposite the inside surface of the cover, the ends being cut to form a rabbet surface that cooperates with the upper portion of the motor to support the cover spaced from the upper portion of the motor and fasteners having sufficient length to attach the cover and motor to the base.

22. The drip cover of claim 21 wherein the cover has a convex shape.

23. The drip cover of claim 21 wherein the cover has a diameter greater than the diameter of the motor.

24. The drip cover of claim 21 wherein the fasteners are selected from the group consisting of bolts and screws.

25. The drip cover of claim 21 wherein the cover is removably mounted on and spaced from the upper portion of the motor.

26. The drip cover of claim 25 wherein the cover is removably mounted on and spaced from the upper portion of the motor by a plurality of bosses mounted on the inner surface of the cover and formed concentrically within the skirt on a circle having the same diameter as the motor and fasteners having sufficient length to attach the cover and motor to the motor base.

27. The drip cover of claim 26 wherein the fasteners are selected from the group consisting of bolts and screws.

28. The drip cover of claim 21 wherein the cover is formed from a material selected from the group consisting of plastic, aluminum and iron.

29. The drip cover of claim 28 wherein the cover is formed from plastic.

30. The drip cover of claim 29 wherein the circumference of the cover has a shape selected from the group consisting of shapes that are generally round, shapes that are generally round with lobes or expansion areas extending radially outwardly from the generally round portion of the shape and shapes that are non-symmetrical in the shape of the letter D and similar letters.

31. A drip cover drip cover for a floor polisher having an upper portion and an upper bearing mounted on a base, the drip cover comprising a cover having a convex shape having an inner surface, a circumference and a diameter greater than the diameter of the motor, a cylindrical skirt extending axially from the circumference of the cover to surround the upper portion of the motor, a cup formed on the inner surface of the cover concentrically with the skirt and sized to hold and protect the upper bearing of the motor, and a downwardly facing electrical connector attached to the inner surface of the cover within the cylindrical skirt and outside the motor, the cover being mounted on and spaced from the upper portion of the motor by a plurality of bosses mounted on the inner surface of the cover and formed concentrically within the skirt on a circle having the same diameter as the motor.

32. The drip cover of claim 31 wherein the plurality of bosses have ends opposite the inside surface of the cover, the ends being cut to form a rabbet surface that cooperates with the upper portion of the motor to support the cover spaced from the upper portion of the motor.

33. The drip cover of claim 31 wherein the cover is formed from a material selected from the group consisting of plastic, aluminum and iron.

34. The drip cover of claim 31 wherein the cover is formed from plastic.

35. The drip cover of claim 31 wherein the circumference of the cover has a shape selected from the group consisting of shapes that are generally round, shapes that are generally round with lobes or expansion areas extending radially outwardly from the generally round portion of the shape and shapes that are non-symmetrical in the shape of the letter D and similar letters.

* * * * *